(12) United States Patent
Duvacquier et al.

(10) Patent No.: US 8,708,367 B2
(45) Date of Patent: Apr. 29, 2014

(54) GAS GENERATION FOR A SAFETY DEVICE, THE CHARGE OF WHICH IS INITIATED BY A HEAT-GENERATING MEANS

(75) Inventors: Daniel Duvacquier, Bordeaux (FR); Xavier Lelievre, Sizun (FR); Yvonnig Patton, Plougastel Daoulas (FR); François Peremarty, Quimper (FR)

(73) Assignee: Seva Technologies, Paris (FR)

( * ) Notice: Subject to any disclaimer, the term of this patent is extended or adjusted under 35 U.S.C. 154(b) by 238 days.

(21) Appl. No.: 12/866,421

(22) PCT Filed: Feb. 9, 2009

(86) PCT No.: PCT/EP2009/000883
§ 371 (c)(1),
(2), (4) Date: Aug. 5, 2010

(87) PCT Pub. No.: WO2009/098085
PCT Pub. Date: Aug. 13, 2009

(65) Prior Publication Data
US 2010/0320735 A1 Dec. 23, 2010

(30) Foreign Application Priority Data
Feb. 7, 2008 (EP) ........................ 0850781

(51) Int. Cl.
*B60R 21/26* (2011.01)
*C06B 45/12* (2006.01)
(52) U.S. Cl.
USPC ........... 280/741; 280/736; 149/14; 149/109.4
(58) Field of Classification Search
USPC ........... 280/741, 73.6, 736; 149/36, 14, 109.4
See application file for complete search history.

(56) References Cited

U.S. PATENT DOCUMENTS

| | | | | |
|---|---|---|---|---|
| 5,109,772 A | * | 5/1992 | Cunningham et al. | ... 102/275.11 |
| 5,588,676 A | * | 12/1996 | Clark et al. | ................. 280/741 |
| 5,726,382 A | * | 3/1998 | Scheffee et al. | .......... 149/19.91 |
| 5,772,243 A | * | 6/1998 | Green et al. | ................. 280/741 |
| 5,829,784 A | * | 11/1998 | Brown et al. | ................. 280/737 |
| 5,984,352 A | * | 11/1999 | Green et al. | ................. 280/736 |

(Continued)

FOREIGN PATENT DOCUMENTS

| | | |
|---|---|---|
| EP | 1323696 A2 | 7/2003 |
| EP | 1304845 A2 | 11/2003 |
| WO | WO-01/89885 A1 | 11/2001 |

OTHER PUBLICATIONS

French Search Report for priority document FR 0850781, established Sep. 15, 2008.

*Primary Examiner* — Karen Beck
(74) *Attorney, Agent, or Firm* — Harness, Dickey & Pierce, P.L.C.

(57) ABSTRACT

A gas generator for a safety device for a motor vehicle, comprises at least two distinct chambers which communicate with each other through at least one opening or nozzle. A first chamber is isolated from the outside. A second chamber or "diffusion" chamber is able to receive gases generated by the combustion of a solid pyrotechnical charge placed in the first chamber, and to discharge them towards the outside. The solid charge is a mixture consisting of at least one oxidizing charge and a reducing charge, the oxygen balance of which is equilibrated. A heat generator is provided which generates sufficient heat for triggering and sustaining the combustion of the charge without any other interaction, notably of the chemical type, between the heat generator and the charge.

21 Claims, 2 Drawing Sheets

(56) References Cited

U.S. PATENT DOCUMENTS

| | | | |
|---|---|---|---|
| 6,196,583 B1* | 3/2001 | Ruckdeschel et al. | 280/736 |
| 6,227,565 B1* | 5/2001 | McFarland et al. | 280/736 |
| 6,234,521 B1* | 5/2001 | Katsuda et al. | 280/736 |
| 6,235,132 B1* | 5/2001 | Knowlton et al. | 149/36 |
| 6,435,552 B1* | 8/2002 | Lundstrom et al. | 280/741 |
| 6,875,295 B2* | 4/2005 | Blomquist et al. | 149/19.7 |
| 7,878,536 B2* | 2/2011 | Rose et al. | 280/737 |
| 7,954,848 B2* | 6/2011 | Hayakawa et al. | 280/736 |
| 7,967,333 B2* | 6/2011 | Staheli et al. | 280/741 |
| 8,097,103 B2* | 1/2012 | Taylor et al. | 149/23 |
| 8,123,878 B1* | 2/2012 | Krupp et al. | 149/2 |
| 8,162,350 B1* | 4/2012 | Parkinson et al. | 280/741 |
| 2001/0026064 A1* | 10/2001 | Bergmann et al. | 280/737 |
| 2003/0145921 A1* | 8/2003 | Blomquist et al. | 149/19.2 |
| 2005/0161923 A1* | 7/2005 | Hirooka et al. | 280/741 |
| 2005/0189053 A1* | 9/2005 | Pile et al. | 149/108.6 |
| 2005/0230949 A1 | 10/2005 | Blackburn | |
| 2006/0005734 A1 | 1/2006 | McCormick | |
| 2010/0007123 A1* | 1/2010 | Cord et al. | 280/741 |
| 2010/0096844 A1* | 4/2010 | Staheli et al. | 280/741 |
| 2010/0206441 A1* | 8/2010 | Baran et al. | 149/1 |
| 2010/0230942 A1* | 9/2010 | Rose et al. | 280/736 |
| 2010/0253053 A1* | 10/2010 | Hayakawa et al. | 280/736 |
| 2010/0269964 A1* | 10/2010 | Zubrin | 149/1 |
| 2010/0307775 A1* | 12/2010 | Robbins et al. | 169/44 |
| 2010/0320735 A1* | 12/2010 | Duvacquier et al. | 280/741 |
| 2011/0025030 A1* | 2/2011 | Mendenhall et al. | 280/741 |
| 2011/0101662 A1* | 5/2011 | Rose et al. | 280/741 |
| 2011/0221175 A1* | 9/2011 | Kobayashi et al. | 280/741 |
| 2011/0290386 A1* | 12/2011 | Silva | 149/61 |

* cited by examiner

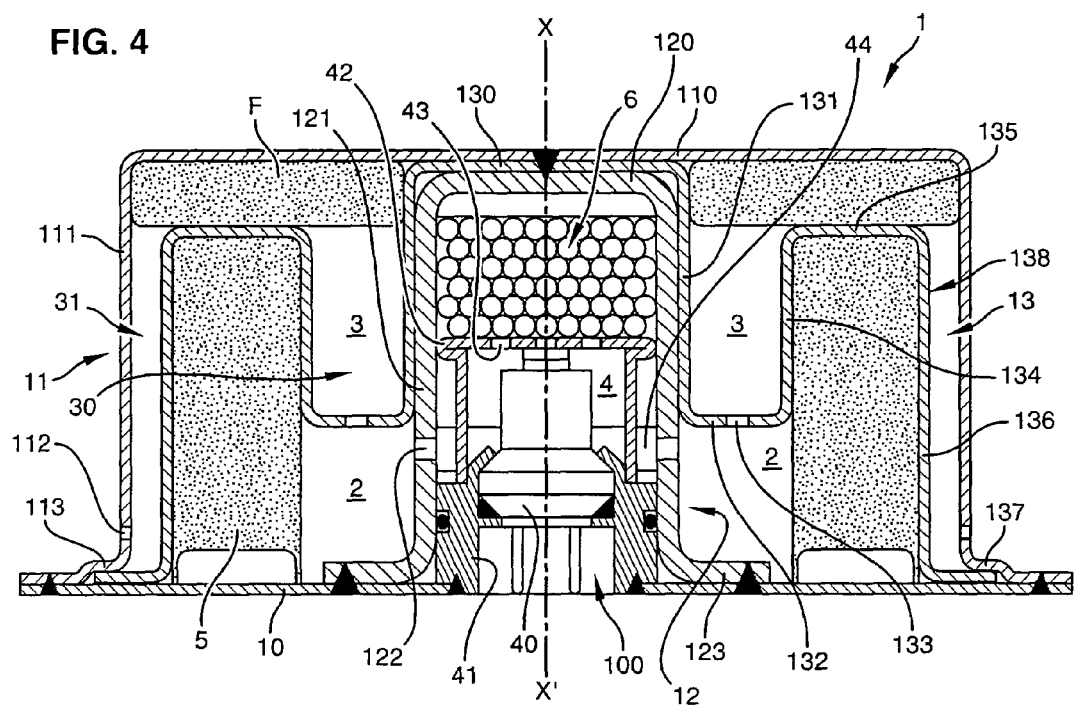
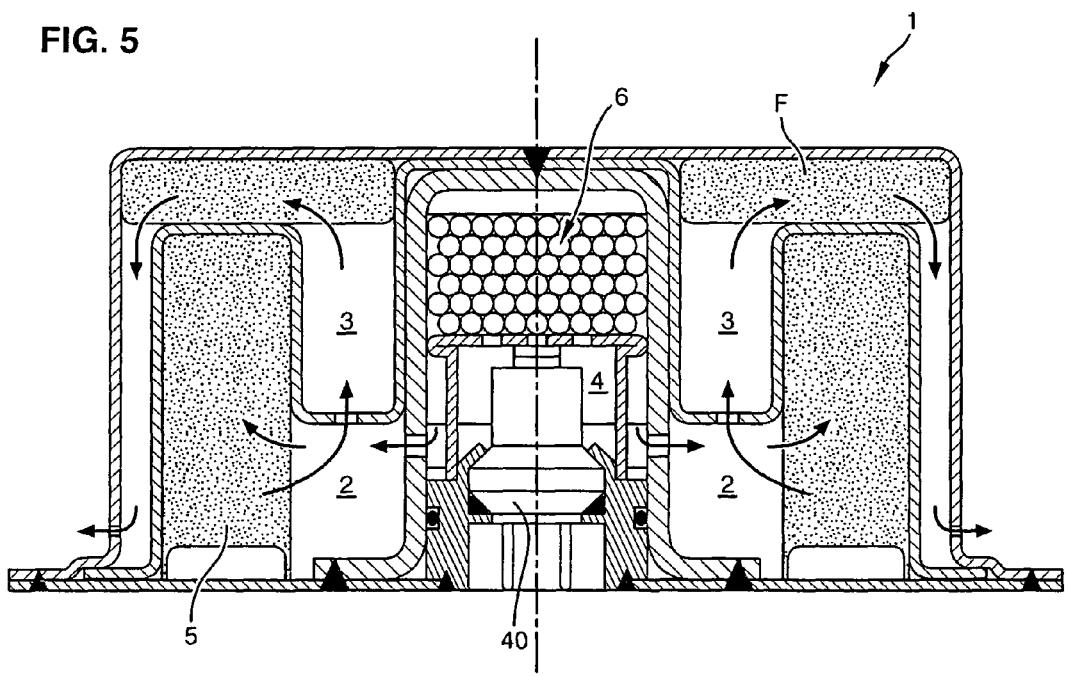

GAS GENERATION FOR A SAFETY DEVICE, THE CHARGE OF WHICH IS INITIATED BY A HEAT-GENERATING MEANS

CROSS-REFERENCE TO RELATED APPLICATIONS

This application is a 371 U.S. National Stage of International Application No. PCT/EP2009/000883, filed Feb. 9, 2009. This application claims the benefit of French Patent Application No. FR 08 50781, filed Feb. 7, 2008. The disclosures of the above applications are incorporated herein by reference.

FIELD

The present invention relates to a gas generator for a safety device for a motor vehicle.

It is used in particular for inflating an air bag, in particular for frontal or lateral protection.

However, it can be adapted to any safety system in which the generation of gas is wanted.

BACKGROUND

Numerous gas generators currently commercially available make use of energetic pyrotechnical charges constituted by propellants. These products, whether extruded or compressed, are adapted with respect to their form and their composition to satisfy the needs of gas generation.

However, these products have considerable added value, therefore high cost. Also, they have a yield which is limited, first by the specifications relative to the levels of toxicity and second by the possibilities of formulating the low-cost main molecules, available commercially.

The document WO-A-01/89885 describes a generator structure which makes use of a charge of energetic matter having a high gaseous yield and at a low cost placed in a first chamber, which is decomposed by a gas jet originating from a combustion chamber in which a propellant burns.

The charges described are respectively strongly oxidising ammonium nitrate, which is associated with a strongly reductive propellant (of "LOVA" type (for "Low Vulnerability Ammunition"), or double base, or any other propellant adapted to need).

The gas jet originating from the combustion chamber passes through a diffusion chamber and enters the chamber containing the ammonium nitrate.

The diffusion chamber is thus the seat of an oxidoreducing reaction between the gases generated by the propellant and those originating from combustion of the ammonium nitrate.

This chemical interaction accordingly takes place in a chamber which is not confined or only slightly confined.

Another existing structure makes use of a propellant whereof the oxygen balance is equilibrated, which disintegrates an oxidoreducing mixture whereof the oxygen balance is likewise equilibrated.

In these two structures, the energetic charge is in the form of powder whereof the granulometry is much less than a millimeter (typically from 10 to 200 micrometers). This involves a very brief decomposition time, incompatible with the operating time expected by the system.

US-A-2006/0005734 describes a gas generator whereof the central diffusion chamber is enclosed by two combustion chambers, in turn arranged in the continuity of an initiator. Each chamber is to some extent "double". Therefore, on the left part of the generator, the initiator communicates with a chamber which contains a relay pyrotechnical charge, in turn relating to a chamber containing the gas-generating charge.

However, the relay charge is there only for initiating, that is, triggering combustion of the pyrotechnical charge.

In the event where the aim is to generate little gas, use is made of a single pyrotechnical charge.

Document EP-A-1323696 describes a gas-generating device which comprises a first charge, the initiation of which causes that of a second oxidoreducing charge with an equilibrated oxygen balance. It is the flow of combustion products which causes initiation of the second charge.

Finally, documents EP-A-1364845 and US-A-2005/230949 describe generators whereof the functioning is similar to that described in the above paragraph.

SUMMARY

The present invention aims to rectify these disadvantages by proposing a gas generator whereof the combustion of the gas-generating charge is not dependent chemically on the combustion of another charge.

Another aim of the invention is to provide a generator which regulates the operating time on demand.

Yet another aim is to propose a generator which makes use of widely available primary materials with high molar yield and at low cost.

The present invention thus relates to a gas generator for a safety device for motor vehicle, which comprises at least two distinct chambers respectively called first and second chambers, which communicate together directly or indirectly via at least one orifice or nozzle, the first of these chambers, a so-called "reaction" chamber, being isolated from the outside, a second, a so-called "diffusion" chamber, being able to receive gases generated by the combustion of a solid pyrotechnical charge placed in the first chamber, and to discharge them via at least one discharge opening communicating with the outside.

This generator is essentially remarkable in that
said energetic charge is a mixture constituted by at least one oxidising charge and one reducing charge for which the oxygen balance of the reaction products is equilibrated;
it is provided with heat generator means which generate sufficient heat to trigger and sustain combustion of said charge, without any other interaction, especially of chemical type, between these means and this charge.

Due to this structure, the sole function of the heat generator means is to trigger and sustain combustion of the charge, this combustion not being dependent on other parameters associated with the heat generator means.

The charge is thus going to be able to be selected from those having a low retail cost, but the molar yield of which originating from the reaction is high.

According to other advantageous and non-limiting characteristics of this generator:
said energetic charge is formed from an assembly of distinct unitary charges, these unitary charges each being separated from the following and the preceding by a destructible screen which offers low heat resistance;
said energetic charge is constituted by an ammonium nitrate/guanidine nitrate mixture;
the solid mixture comprises 33 to 53% of ammonium nitrate and 47 to 67% of guanidine nitrate, ensuring an oxygen balance equilibrated to within ±5%;
said energetic charge is in the form of an aqueous solution;
the aqueous solution comprises 65 to 75% water and 25 to 35% $CaCl_2$.

said heat generator means is a pyrotechnical charge contained in a third chamber, called combustion chamber, isolated from the exterior, which communicates directly or indirectly, by at least one orifice or nozzle, with the first and second chambers;

said charge is formed by a propellant;

it is of tubular type;

said screen has a contour which corresponds substantially to the cross-section of the first chamber;

said second and third chambers enclose the first chamber comprising the solid pyrotechnical charge;

said charge is distributed circumferentially inside the first chamber, so as to generate a generally charge-free axial channel which has the second and third chambers communicate with each other;

said first chamber comprises means for retaining the charge, permeable to heat and gases;

the generator is of discoidal shape;

said heat generator means are non-chemical means which act via radiation, convection or conduction.

BRIEF DESCRIPTION OF THE DRAWINGS

Other characteristics and advantages of the present invention will emerge from the following detailed description, given in reference to the attached diagrams, in which:

FIG. 4 is a transversal sectional view of a generator according to the invention, which has a discoidal shape;

FIG. 5 is a view similar to the preceding, which is essentially intended to display the path taken by the gases.

DETAILED DESCRIPTION

Figure 1:
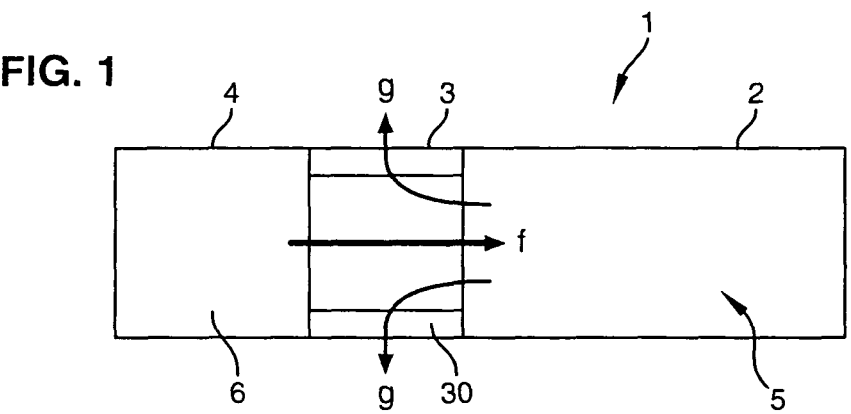
FIG. 1 is a highly simplified diagram of a gas generator, of tubular shape, according to the invention.

The generator illustrated in the attached FIG. 1 is a generally known structure.

In this case, it is a generator 1 of tubular type, for example a metallic envelope, which is compartmented into three chambers 2, 3 and 4 placed successively after one another.

They communicate with one another via openings or nozzles, not shown here, formed in walls which separate each one from each other.

The chamber 2 has no communication opening with the exterior (outside). This chamber encloses an energetic charge 5. According to a variant embodiment, this charge is formed by a solid mixture constituted by at least one oxidising charge and a reducing charge whereof the oxygen balance is equilibrated. This effectively reduces the toxicity of the gases produced during reaction.

The expression "equilibrated oxygen balance" means that the oxidising and reducing charges are capable of reacting fully with one another, that is, without an additional supply of oxygen being necessary, such that on completion of the oxidoreducing reaction, there is no compound which has not reacted.

The chamber 3 is a diffusion chamber which communicates both with the chambers 2 and 4 but likewise to the exterior, for example via a filter referenced 30, via openings, not shown here.

Finally, the generator comprises a chamber 4, which also does not communicate with the exterior and which receives heat generator means.

These means 6 are capable of disintegrating the charge 5 contained in the chamber 2.

When it is employed in relation to the charge 5, the term "disintegrate" is utilised here to define a physical phenomenon or a chemical reaction, such as vaporisation, combustion or sublimation, suitable for liberating gas moles.

In FIG. 1, the arrow f designates the heat flow generated by the means 6, this flow being directed to the chamber 2. The gases resulting from disintegration of the charge 5 spread into the diffusion chamber 3 and exit therefrom to inflate a motor vehicle safety system, for example of airbag type, not shown here. This escape is symbolised by the arrows g.

With respect to the charge 5, it is preferred to use products whereof the molar yield is high and which are widely available and at low cost.

Therefore, a mixture constituted by ammonium nitrate (oxidising) and guanidine nitrate (reducing) is perfectly suitable.

By way of example the mixture comprises 33 to 53% of ammonium nitrate and 47 to 67% of guanidine nitrate, thus ensuring an oxygen balance equilibrated to within ±5%.

According to another variant, the energetic charge can be in liquid form, for example constituted by a mixture of 65 to 75% water and 25 to 35% of $CaCl_2$.

The heat generator means 6 are means whereof the quantity of heat emitted pilots, i.e. controls the decomposition duration of the charge 5.

Therefore, if the aim is short decomposition duration, a generator delivering a substantial quantity of heat in a very short time will be used, whereas inversely, if the aim is long decomposition duration, a heat generator providing a lesser quantity of heat over a longer duration will be used.

By way of indication, the disintegration periods are generally between 30 and 60 milliseconds for the inflation of an airbag for a frontal application, and from 5 to 25 milliseconds for side applications.

In the present embodiment, it is envisaged that the means 6 are constituted by an energetic charge of propellant type. A charge providing a progressive, constant or degressive gas flow according to the preferred application of the generator could also be used.

In another embodiment, use can be made of adaptive or controllable heat generator means such as a laser beam, a gas burner or a resistive wire or even any other heating means employing physical phenomena such as radiation, conduction or convection.

In such a hypothesis, it could be provided to dispense with the chamber 4 and to mount the generator means closest to the diffusion chamber 3.

Figure 2:
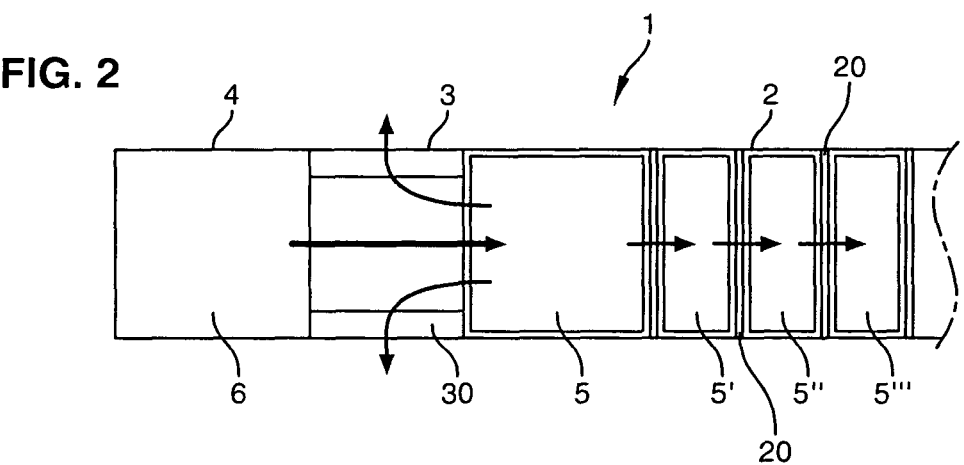
FIG. 2 is likewise a highly simplified diagram of another embodiment of this generator.

FIG. 2 illustrates a variant of the precedent generator in which the heat generator means 6 are of pulse type, that is, constituted by a pyrotechnical charge.

In this embodiment, the charge 5 is fractionated into several distinct unitary charges referenced 5, 5', 5", 5'". These charges are separated two by two by a destructible screen 20 which has low resistance to heat. These are preferably screens whereof the contour corresponds substantially to the cross-section of the chamber 2.

Under the effect of the heat flow, the screens 20 accordingly are destroyed in turn, which effectively diffuses the heat to the following charge, but with sufficient retarding effect to regulate the operating time of the charge on demand.

Such a generator is compact and light and low-cost. In fact, it utilises low-cost and high-yield gaseous energetic charging. Similarly, it utilises well-known assembly methods and includes a small number of components. Finally, it allows indistinct use of bulk charging of powder, granule or pellet type. The charging can likewise be monolithic.

Figure 3:
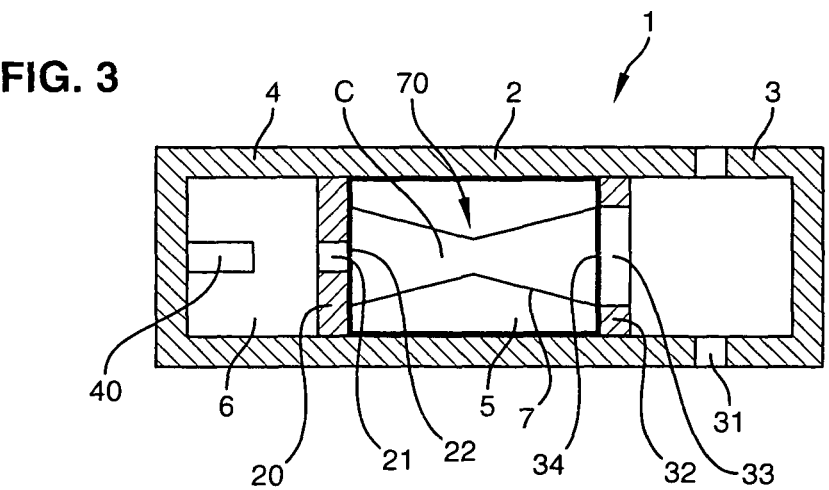
FIG. 3 is another highly simplified diagram of another variant embodiment of this generator.

The generator illustrated in FIG. 3 is always a tubular generator. However, it differs from those described earlier in that the diffusion chamber 3 no longer fits between the chambers 2 and 4, but fits opposite the chamber 4.

The latter is provided with a primer referenced 40 and contains a charge 6 made up of propellant for example.

It is separated from the adjoining chamber 2 by a partition 20 pierced by an axial opening or nozzle 21. A cap 22 blocks this orifice, to the side of the chamber 2.

The chamber 2 is as such separated from the diffusion chamber 3 by a partition 32 provided with an opening or nozzle 33, having a diameter greater than that of the nozzle 21. It is also blocked by a cap 34 also placed on the inside of the chamber 2.

The chamber 2 encloses the charge 5 which is distributed circumferentially in the chamber so as to generate a generally axial charge-free channel C, which has the chambers 3 and 4 communicate with each other. Means 7 for retaining the charge are provided to achieve this, which have the form of a conduit and whereof the wall is permeable to gas and to heat.

In their intermediate part, these means 7 comprise a section restriction referenced 70. The retaining means are for example in the form of a perforated grille formed according to the preferred geometry.

The operation of such a generator is the following.

The primer 40 is initiated and causes combustion of the charge 6, such that the chamber 4 increases in pressure. When this pressure arrives at a predetermined threshold, the cap 21 ruptures and the gases exit therefrom and pass through the chamber 2 containing the charge 5.

The section restriction 70 of the means 7 disperses the gas jet which then impacts the charging of nitrates retained by the element 7.

At the same time, a small portion of the gas passes directly through the conduit C and opens the second cap 34. The pressure required for this opening is less than that which activates opening of the pyrotechnical chamber 4. The gases resulting from combustion of the charge 5 can then escape via the diffusion chamber 3, by way of the openings 31 provided for this purpose.

The chamber 4 can be made by using materials of considerable thickness, since it is subject to high pressure. On the contrary, the two chambers 2 and 3 can be made by using materials of lesser thickness, since they are subject to lower pressures.

Such a structure reduces the general size of the assembly. It has a simplified design and allows diffusion of the inflation gases relative to the primer, thus securing it. Finally, such a generator is particularly light.

In the embodiment in FIG. 4, the generator is formed by a generally discoidal revolutionary body.

It comprises a circular support plate 10 provided with a central opening 100 of likewise circular shape and of an axis X, X'. Resting on this support plate is a cover 11 having a circular base 110 centred on the abovementioned axis, which is connected to a cylindrical wall 111 whereof the generatrices extend parallel to said axis.

The free end of the latter is folded down at 90° to the exterior to constitute a peripheral collar 113 which ensures fixing to the plate 10, especially by welding. It is evident that the cylindrical wall 111 is pierced by a series of radial orifices 112, arranged near the collar 113.

Mounted inside the resulting assembly are two partitioning elements referenced 12 and 13.

The first partitioning element 12 has a general overall appearance similar to that of the cover. Its base 120 therefore extends parallel to the base 110.

Its peripheral wall 121 has a height slightly less than that of the wall 111 and its free end is folded down at 90° to the exterior to constitute a collar 123, which is likewise fixed to the plate 10, especially by welding. It is likewise evident that the peripheral wall of this partitioning element 12 has a series of openings 122 to be referred to hereinbelow.

The second partitioning element 13 is nested onto the upper part of the element 12. Its central part, constituted by a base 130 and a cylindrical wall 131, fits between the cover 11 and the first partitioning element 12. The lower edge of the cylindrical wall 131 is folded down at 90° to the exterior to delimit a wall 132 parallel to the collars 113 and 123. This wall connects to an element forming an annular reservation 137, in turn delimited by two cylindrical and concentric walls 134 and 136, as well as by a base wall 135.

The free rim of the external wall 136 is folded down at 90° to the exterior to form a collar 137, which is gripped between the plate 10 and the collar 113.

It is evident that the abovementioned wall 132 is provided with openings 133, the function of which is to be explained hereinbelow.

Inside the space delimited both by the support plate 10 and by the first partitioning element 12 is mounted a primer 40 whereof the pins are accessible via the above opening 100. This primer is in place on a support 41 of known type.

Resting on this support is a grille 42 provided with openings 43, the function of which is to hold heat generator means 6 at a distance from the primer 40.

The abovementioned openings 122 are placed at the level of the peripheral wall 121, such that they are located opposite the primer, slightly above its support, in the free space made by the grille 42. These openings are blocked by a cap 44 which can be destroyed beyond a certain pressure.

The positioning of the openings 122 is likewise selected so that it is located on this side of the wall 132 of the second partitioning element 13.

The walls 134, 135 and 136 of the second partitioning element delimit an annular space which receives a solid charge 5 constituted by at least one oxidising charge and one reducing charge. This charge is preferably packed inside an airtight material able to fragment under the effect of pressure.

In addition, the wall 135 of the element 13 serves as support to an annular filter F which constitutes separation means between the walls 131 and 134 on one side and between the walls 136 and 111 on the other side.

Reference is made to FIG. 5 to explain the functioning of such a device to the extent where the different circuits followed by the gases are illustrated, in the form of arrows.

Following triggering of the initiator 40, the gases passing through the grille 43 and causing initiation of the heat generator means 6 which, in the present case, are constituted by propellant pellets. The gases generated in turn pass through the grille 43 via its openings 43 and leave the combustion chamber 4 through the openings 122, after having caused the cap 44 to rupture.

They then enter the combustion chamber 2, at the periphery of which is placed the charge 5, which disintegrates under the effect of the heat contribution.

The resulting gas flow passes through the openings 133, progresses across the filter F and rushes into the peripheral passageway delimited by the walls 136 and 111.

Finally, the gases escape via the openings 112 formed in the base of the cover 11 and fill the airbag, not shown here.

Such a structure has substantially the same advantages as those described previously, in terms of compactness and low cost in particular.

In the present application, all percentages are expressed in weight.

The invention claimed is:

1. A gas generator for a safety device for a motor vehicle, the gas generator comprising:
   at least a first chamber and a second chamber, the first chamber isolated from the outside, the second chamber in communication with the first chamber;
   an energetic charge disposed in the first chamber, the energetic charge being a mixture of at least one oxidizing charge and one reducing charge for which an oxygen balance of reaction products is equilibrated; and
   a heat-generating device for generating sufficient heat for triggering and sustaining combustion of the energetic charge without any chemical interaction between the heat generating device and the energetic charge;
   wherein the second chamber receives gases generated by reaction of the energetic charge within the first chamber and the gases are discharged via at least one discharge aperture of the second chamber that is in communication with the outside; and
   wherein the energetic charge is formed of an assembly of distinct unit charges, the unit charges being each separated by a destructible screen which provides low resistance to heat and retards combustion to decrease combustion speed.

2. The generator according to claim 1, wherein the energetic charge includes a solid mixture of ammonium nitrate/guanidine nitrate.

3. The generator according to claim 1, wherein the energetic charge is in a form of an aqueous solution.

4. A gas generator for a safety device for a motor vehicle, the gas generator comprising:
   at least a first chamber and a second chamber, the first chamber isolated from the outside, the second chamber in communication with the first chamber;
   an energetic charge disposed in the first chamber, the energetic charge being a mixture of at least one oxidizing charge and one reducing charge for which an oxygen balance of reaction products is equilibrated; and
   a heat-generating device for generating sufficient heat for triggering and sustaining combustion of the energetic charge without any other interaction, notably of a chemical type, between the heat generating device and the energetic charge;
   wherein the second chamber receives gases generated by reaction of the energetic charge within the first chamber and the gases are discharged via at least one discharge aperture of the second chamber that is in communication with the outside;
   wherein the energetic charge includes an aqueous solution including 65 to 75% water and 25 to 35% calcium chloride.

5. The generator according to claim 1, wherein the heat-generating device is a pyrotechnical charge contained in a third chamber isolated from the outside which at least indirectly communicates through at least an opening or nozzle with the first and second chambers.

6. The generator according to claim 5, wherein the pyrotechnical charge of the heat generating device is formed with an energetic charge of a propellant type.

7. The generator according to claim 1, wherein the generator is of a tubular type.

8. The generator according to claim 1, wherein the energetic charge is circumferentially distributed inside the first chamber, so as to generate a generally axial charge-free channel which has the second chamber in communication with a third chamber.

9. The generator according to claim 8, wherein the first chamber includes means for retaining the charge permeable to heat and to gases.

10. The generator according to claim 5, wherein the generator assumes a discoidal shape.

11. The generator according to claim 1, wherein the heat-generating device is a non-chemical device which acts by one of radiation, convection and conduction.

12. The generator according to claim 4, wherein the energetic charge is formed of an assembly of distinct unit charges, the unit charges being each separated by a destructible screen which provides low resistance to heat.

13. The generator according to claim 4, wherein the heat generating device is a pyrotechnical charge contained in a third chamber isolated from the outside which at least indirectly communicates through at least an opening or nozzle with the first and second chambers.

14. The generator according to claim 13, wherein the pyrotechnical charge of the heat generating device is formed with an energetic charge of a propellant type.

15. The generator according to claim 4, wherein the generator is of a tubular type.

16. The generator according to claim 13, wherein the second and third chambers are on opposite sides of the first chamber.

17. The generator according to claim 13, wherein the generator assumes a discoidal shape.

18. The generator according to claim 4, wherein the heat-generating device is a non-chemical device which acts by one of radiation, convection and conduction.

19. The generator according to claim 1, wherein the heat-generating device may be selected to provide one of a first disintegration period for the energetic charge and a second disintegration period for the energetic charge.

20. The generator according to claim 19, wherein the first disintegration period is generally between 30 and 60 milliseconds and the second disintegration period is generally between 5 and 25 milliseconds.

21. The generator according to claim 1, wherein the heat-generating device solely generates heat for triggering and sustaining combustion of the energetic charge without any chemical interaction between the heat generating device and the energetic charge.

* * * * *